(12) United States Patent
Kyoshima et al.

(10) Patent No.: US 8,342,631 B2
(45) Date of Patent: Jan. 1, 2013

(54) INKJET PRINT APPARATUS AND INKJET PRINT METHOD

(75) Inventors: Masayuki Kyoshima, Tokyo (JP); Masaki Oikawa, Inagi (JP); Keiji Tomizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 12/897,310

(22) Filed: Oct. 4, 2010

(65) Prior Publication Data
US 2011/0084999 A1  Apr. 14, 2011

(30) Foreign Application Priority Data
Oct. 8, 2009  (JP) ................... 2009-234217

(51) Int. Cl.
*B41J 29/38*  (2006.01)
(52) U.S. Cl. .............. 347/14; 347/5; 347/9; 347/15; 347/16; 347/41
(58) Field of Classification Search .............. 347/12, 347/14–16, 5, 40, 41, 9
See application file for complete search history.

(56) References Cited

U.S. PATENT DOCUMENTS

| | | |
|---|---|---|
| 2007/0216724 A1* | 9/2007 | Shibata et al. .............. 347/41 |
| 2008/0158275 A1* | 7/2008 | Masuyama et al. ............ 347/9 |
| 2010/0328384 A1 | 12/2010 | Kyoshima et al. |

FOREIGN PATENT DOCUMENTS

JP  2006-192892 A  7/2006

* cited by examiner

*Primary Examiner* — Laura Martin
(74) *Attorney, Agent, or Firm* — Fitzpatrick, Cella, Harper & Scinto (57) ABSTRACT

An objective is to provide an inkjet print apparatus and an inkjet print method capable of a print without concentration unevenness. To achieve the objective, in a multiple-pass print using mask patterns each having low-print-percentage areas and high-print-percentage areas, the print-percentage difference between high-print-percentage areas and low-print-percentage areas is cancelled out in left-edge and right-edge parts of an image to be printed.

5 Claims, 6 Drawing Sheets

INKJET PRINT APPARATUS AND INKJET PRINT METHOD

BACKGROUND OF THE INVENTION

1. Field of the Invention

The present invention relates to an inkjet print method and an inkjet print apparatus by which an image is printed on a print medium by using an inkjet print head having nozzle arrays each including ink-ejecting nozzles densely arranged.

2. Description of the Related Art

With the spread of information processing devices and communication devices, such as computers and word processors, there are more and more demands for output devices that output digital image information processed by such devices. As one of such output devices, an inkjet print apparatus that forms dots on a print medium through ejection of ink droplets is rapidly spreading. Recent demands increasingly call for output devices capable of outputting color print images. Since output of photograph images particularly requires high image quality, reduction in volume of each ink droplet is anticipated.

Meanwhile, with the recent technical development in integrated arrangement of nozzles, production of high-density, long print head is getting possible. However, print operations using such high-density, long print head can cause the following problem. Specifically, high speed print-head scanning or print-medium scanning generates an air current between the print head and the print medium. In addition, simultaneous ejection of many ink droplets from the print head having nozzles densely arranged generates turbulence in the air current. As a result, landing positions of the ink droplets are shifted from their desired positions, drastically deteriorating the image quality.

A technique disclosed by Japanese Patent Laid-Open No. 2006-192892 is known as a method for preventing such image quality deterioration. In Japanese Patent Laid-Open No. 2006-192892, a print is performed using mask patterns in which image data is thinned out. Specifically, image data to be printed is thinned out with different high and low thinning percentages alternately in an arrangement direction of the nozzles. Printing on the same area multiple times by using such mask patterns reduces the turbulence of the air current generated between the print head and the print medium, and allows the landing position of each ink droplet to be kept accurate. Thereby, a high quality image can be obtained.

In the technique described in Japanese Patent Laid-Open No. 2006-192892, an enough space for allowing the air current to escape is formed between walls of ejected ink. Accordingly, high-print-percentage areas and low-print-percentage areas need to have lengths appropriate for forming such space, and therefore have such sizes that a concentration difference in the pattern in one scan is visually distinguishable. An image in each area is formed by images by different scans compensating for each other. Accordingly, when the images are printed with a reciprocating scan, a scan start portion and a scan end portion overlap each other in left-edge and right-edge parts of the images.

For example, if a print of an image in the same area is completed with two scans, a scan start portion of a first scan and a scan end portion of a second scan overlap and compensate for each other, focusing on the edge parts of the image. Generally, at the start of the scans, the temperature of the print head is as low as approximately an ambient temperature because of a standby time for, for example, feeding the print medium between the scans. Meanwhile, at the end of the scans, the print head has an elevated temperature because of the ejection operations during the scans. For this reason, a high-print-percentage area printed at the start of the scans and a high-print-percentage area printed at the end of the scans with the print head having an elevated temperature have different print concentrations due to the temperature change of the print head. Thus, concentration unevenness tracing the mask patterns is reflected in the printed image in some cases.

SUMMARY OF THE INVENTION

Hence, the present invention has an objective to provide an inkjet print apparatus and an inkjet print method capable of a print without concentration unevenness.

An inkjet print apparatus of the present invention includes: print device that performs a print by ejecting ink from a print head; scan device that causes the print device to scan a same print area a plurality of times; thinning device that thins out binary image data for the same print area by using different mask patterns corresponding to the respective plurality of times of the scans of the same print area; and print control device that completes the print on the same print area by printing thinned images on the same print area on the basis of binary image data sets obtained by the thinning device for the respective plurality of times of the scans. In the above apparatus, each of the different mask patterns includes a first area and a second area, the first area having the binary image data thinned out at a relatively high percentage, the second area having the binary image data thinned out at a relatively low percentage. A difference in print percentage between the first area and the second area in each of both edge parts of an image to be printed where the print head scans back is smaller than a difference in print percentage between the first area and the second area in a center part of the image.

Furthermore, an inkjet print method of the present invention includes: a print step of performing print by ejecting ink from a print head; a scan step of causing the print device to scan a same print area a plurality of times; a thinning step of thinning out binary image data for the same print area by using different mask patterns corresponding to the respective plurality of times of the scans of the same print area; and a print control step of completing the print on the same print area by printing thinned images on the same print area on the basis of binary image data sets obtained by the thinning device for the respective plurality of times of the scans. In the above method, each of the different mask patterns includes a first area and a second area, the first area having the binary image data thinned out at a relatively high percentage, the second area having the binary image data thinned out at a relatively low percentage. A difference in print percentage between the first area and the second area in each of both edge parts of an image to be printed where the print head scans back is smaller than a difference in print percentage between the first area and the second area in a center part of the image.

According to the inkjet print apparatus of the present invention, each of the different mask patterns includes a first area and a second area, the first area being where the binary image data is thinned out at a relatively high percentage, the second area being where the binary image data is thinned out at a relatively low percentage. A difference in print percentage between the first area and the second area in each of both edge parts of an image to be printed where the print head scans back is smaller than a difference in print percentage between the first area and the second area in a center part of the image. Thereby, an inkjet print apparatus capable of a print without concentration unevenness can be provided.

Further features of the present invention will become apparent from the following description of exemplary embodiments (with reference to the attached drawings).

DESCRIPTION OF THE EMBODIMENTS (First Embodiment)
(Basic Configuration)

A basic configuration of a first embodiment of the present invention is described below with reference to the drawings.

Figure 1:
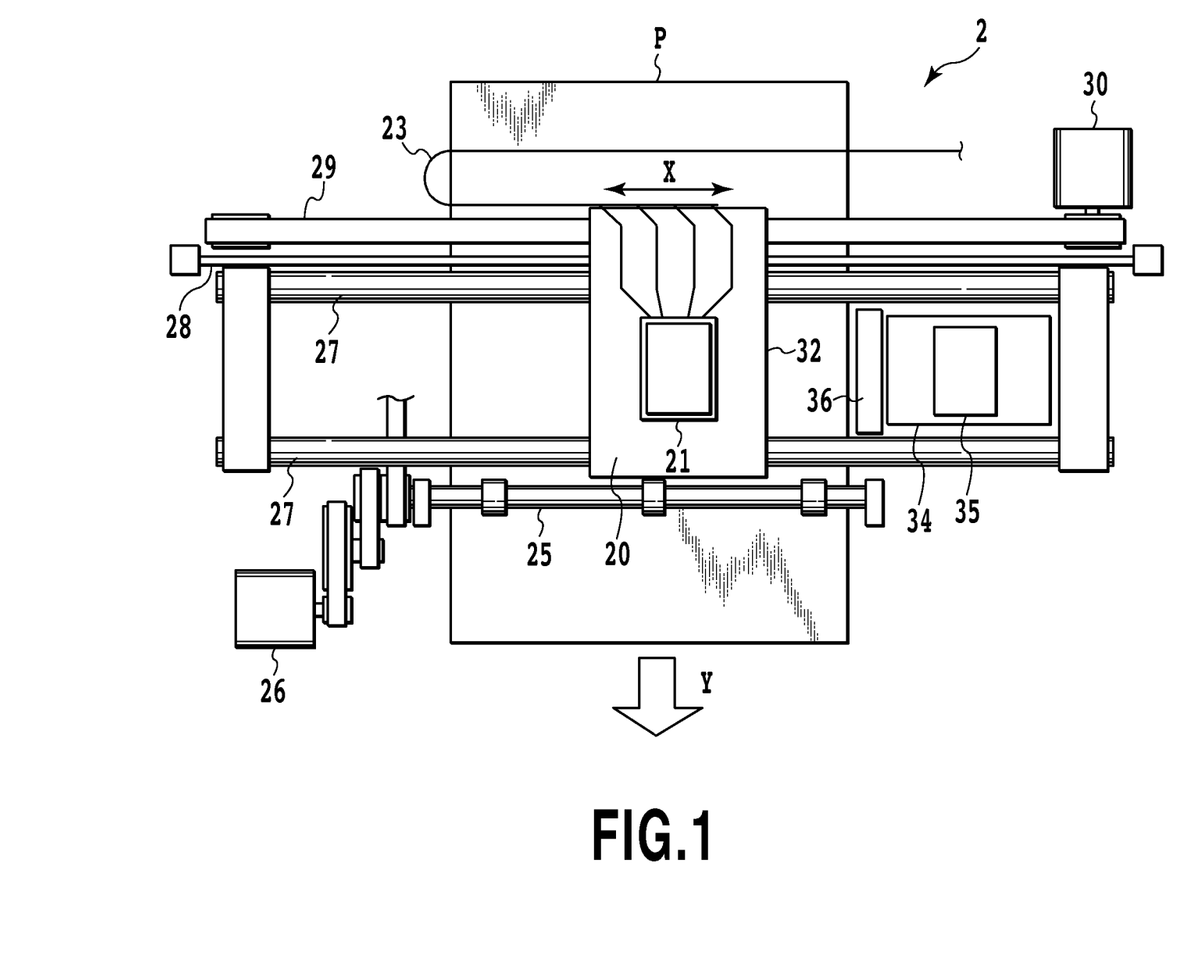
FIG. 1 is a front view of an inkjet print apparatus applicable to a first embodiment.

FIG. 1 is a front view showing a schematic configuration of a serial-type inkjet print apparatus (also simply called a print apparatus below) applicable to the present embodiment. A carriage 32 is supported by a guide shaft 27 and a linear encoder 28 while being allowed to reciprocate along a main scan direction (an X direction). A drive belt 29 moves by being driven by a carriage motor 30 and thus reciprocates the carriage 32 along the guide shaft 27. An inkjet print head 21 (also simply called a print head 21 below) is detachably mounted on the carriage 32.

In the print head 21, multiple ejecting portions (also called nozzles below) for ejecting ink are arranged. A liquid path formed in each nozzle of the print head 21 is provided with a heating element (an electric-heat converter) that generates heat energy for ejecting ink in the liquid path. The serial-type inkjet print apparatus is also provided with a transport mechanism that transports a print medium P, such as a plain paper sheet, a high-quality special-purpose paper sheet, an OHP sheet, a glossy paper sheet, a glossy film, or a postcard. The transport mechanism includes a transport roller (not shown), a paper ejection roller 25, a transport motor 26, and others, and transports the print medium P intermittently in a sub scan direction (a direction denoted by arrow Y) by the drive of the transport motor 26.

The print head 21 and the transport mechanism receive an ejection signal and a control signal from a control system, which will be described later, through a flexible cable 23, and operate according to the ejection signal, the control signal, and the like. Each heating element of the print head 21 is driven based on the ejection signal and on a position signal for the carriage 32 outputted from the linear encoder 28. Using heat energy generated by being driven, the heating element ejects an ink droplet from the nozzle and lands it on the print medium P. Further, based on the control signal, the transport mechanism transports the print medium P in a certain distance in the sub scan direction between one main scan and the next.

An image is formed on the entire print medium P by repeating scanning multiple times through the print operations by the print head 21 and the transport operations by the transport mechanism. A recovery unit 34 is installed at a home position of the carriage 32, which is set outside of the print area. The recovery unit 34 includes a cap portion 35 capable of capping and uncapping ejection outlets formed in the print head 21.

Figure 2:
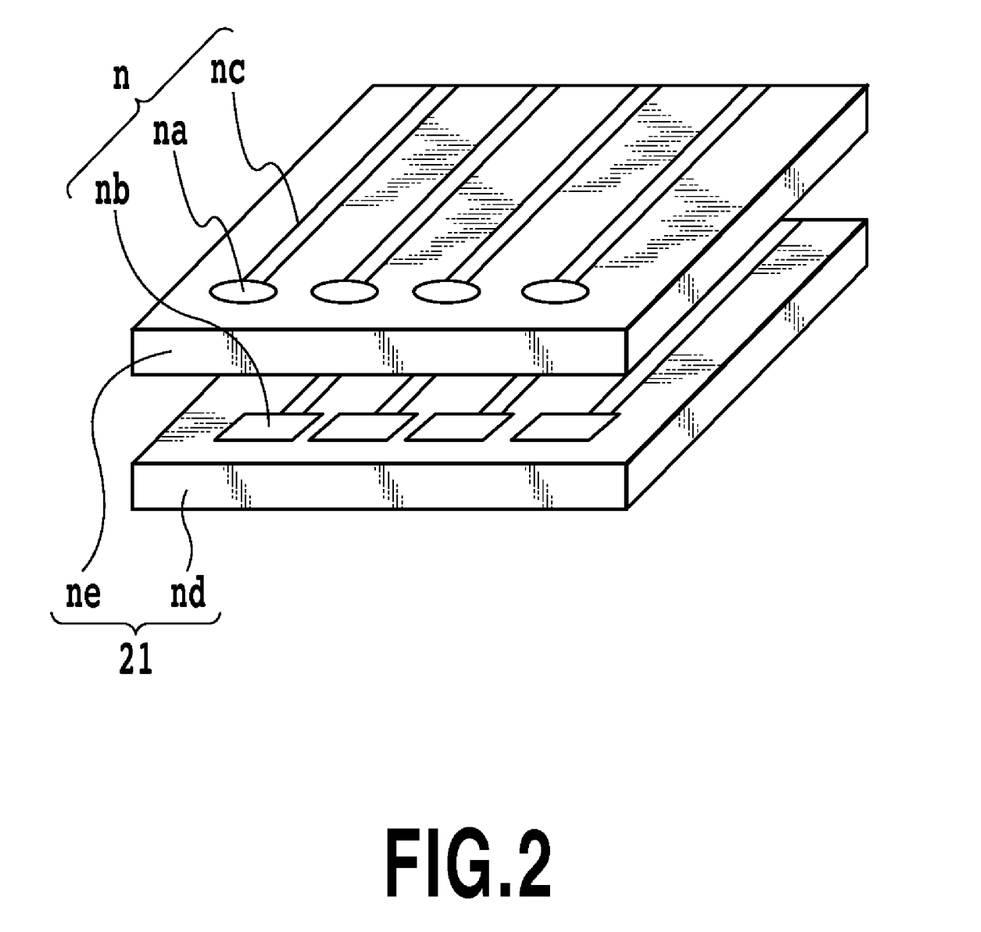
FIG. 2 is a diagram illustrating an ejection portion provided to a print head of the print apparatus of FIG. 1.

FIG. 2 is a diagram illustrating a structure of the ejection portions (nozzles) provided to the print head 21 of the print apparatus of the present embodiment. The schematic structure of the print head 21 includes a heater board nd on which multiple heaters nb for heating ink, and a top board ne covering the heater board nd from above. Multiple ejection outlets na and tunnel-like liquid paths nc are formed in the top board ne. The liquid paths nc are located at the rear of the respective ejection outlets na, and are continuous thereto.

The liquid paths nc are connected to a common ink chamber located behind them. Ink is supplied to the ink chamber through an ink supply inlet, and is then supplied to each of the liquid paths nc from the ink chamber. The heater board nd and the top board ne are relatively positioned so that the liquid paths nc may correspond to the respective heaters nb, and are bonded to each other. In FIG. 2, only four heaters nb are shown, but one heater nb is placed for one liquid path nc correspondingly. When the heater nb is supplied with a certain drive pulse, ink on the heater nb boils, forming a bubble. The bubble formation expands the ink in volume, causing ink in the liquid path nc to be ejected from the ejection outlet na in the form of a droplet. Note that the ejection outlet na, the heater nb, and the liquid path nc form a nozzle (ejection portion) n.

Figure 3:
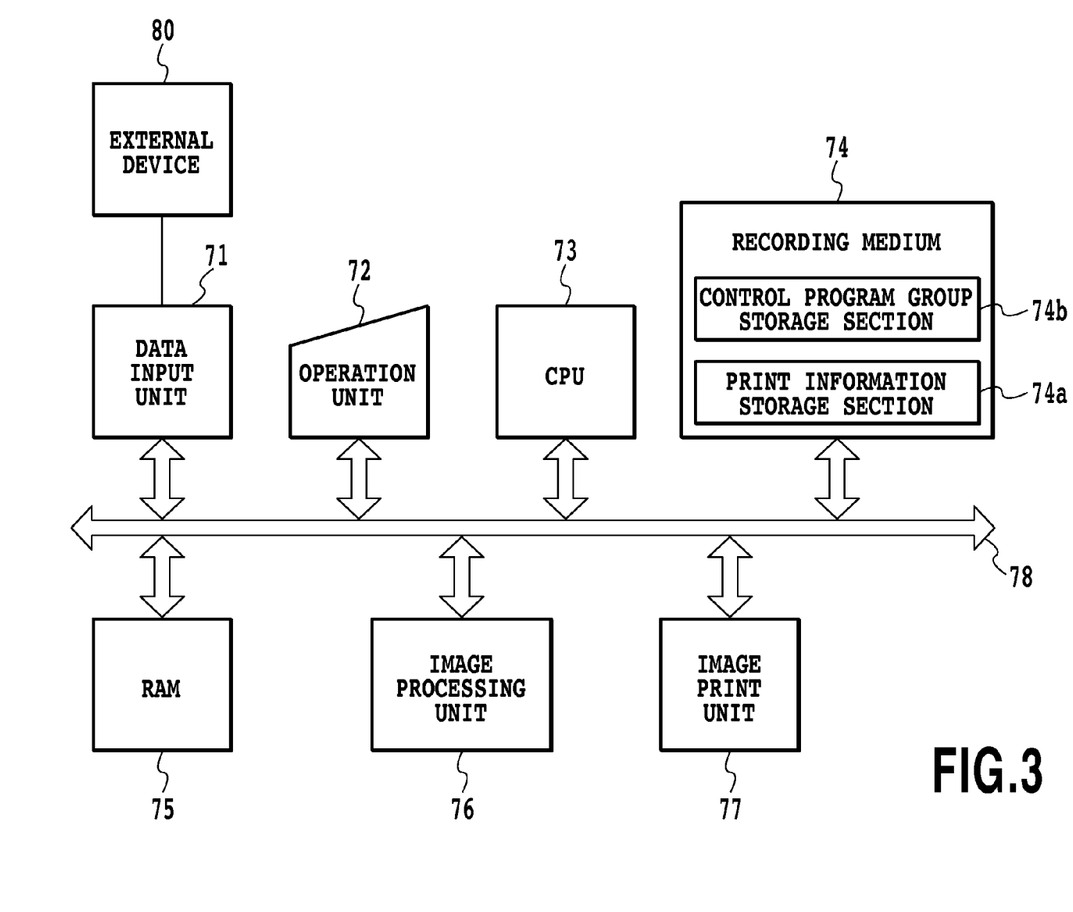
FIG. 3 is a block diagram showing a configuration example of a control system of the inkjet print apparatus.

FIG. 3 is a block diagram showing one configuration example of a control system of the inkjet print apparatus of the present embodiment. A data input unit 71 receives image data, control data, and the like sent from an external device 80 such as a host computer. An operation unit 72 performs data input, setting operations, and the like. The CPU 73 performs processing of various kinds of information as well as print control. A storage medium 74 stores various kinds of data. The storage medium 74 includes a print information storage section 74a and a program storage section 74b. The print information storage section 74a stores image print information, such as information on a print medium (mainly its type), information on ink, information on the environment at the time of printing, such as a temperature, a humidity level, and the like. The program storage section 74b stores a group of various control programs.

A RAM 75 temporarily stores processing data, input data, and the like of the CPU 72. An image processing unit 76 performs certain image processing, including color conversion processing, binarization processing, and the like, on input image data. An image print unit 77 performs image output using the print head 21, the transport mechanism, and the like. A bus line 78 is used to transmit address signals, data, control signals, and the like in the inkjet print apparatus. Examples of the external device 80 include an image input device, such as a scanner and a digital camera, a personal computer, and the like. The data input unit 71 receives multi-valued image data (e.g., 8-bit RGB data) outputted from a scanner, a digital camera, or the like, or multi-valued image data saved in a hard disk of a personal computer.

The operation unit 72 is provided with various keys for performing settings of various parameters, input of print start instructions, and the like. The CPU 73 performs overall control of the inkjet print apparatus in accordance with the various programs stored in the storage medium 74. The storage medium 74 stores a program for operating the inkjet print apparatus in accordance with control programs and error processing programs, and all operations of the present embodiment are executed according to this program. Media usable as the storage medium 74 storing this program include a ROM, an FD, a CD-ROM, an HD, a memory card, an magneto-optical disk, and the like. The RAM 75 is used as a work area for executing the various programs stored in the storage medium 74, a temporary evacuation area during error processing, and a work area for image processing.

In the RAM 75, it is possible to modify the contents of various tables copied from the storage medium 74, and to proceed image processing by referring to the tables thus modified. The image processing unit 76 performs color separation processing for converting inputted multi-valued image data (e.g., 8-bit RGB data) into a multi-valued data (e.g., 8-bit CMYBk data) for each ink color on a pixel basis. Further, the image processing unit 76 quantizes the pixels of the multi-valued data for each color so that each pixel indicates its gradation value K (e.g., indicating any one of 17 values). Then, the image processing unit 76 performs processing for setting a dot arrangement pattern which corresponds to the gradation values "K" (each gradation value being 0 to 16) indicated by the pixels thus quantized.

Although a multi-valued error diffusion method is used for the processing of obtaining K values, the present embodiment is not limited to such a case. It is also possible to use any halftone process method or the like, such as an average concentration saving method or a dither matrix method. After the processing of obtaining K values, the image processing unit 76 performs dot arrangement pattern processing to obtain a dot arrangement pattern, for each unit area, corresponding to the gradation values. Then, the image processing unit 76 performs thinning processing which uses thinning mask patterns to split the binary print data, generated by the dot arrangement pattern processing, among multiple print scans performed by the print head 21. Note that the multiple print scans by the print head 21 include a single print scan performed by a print head including two or more nozzle arrays.

By repeating the above processing, the image data processing unit 76 generates binary print data sets each indicating ejection and non-ejection of each of the nozzles of the print head 21. Then, the image print unit 77 performs ink ejection based on the binary print data sets generated by the image data processing unit 76, and thus forms a dot image on the print medium P.

Figure 4:
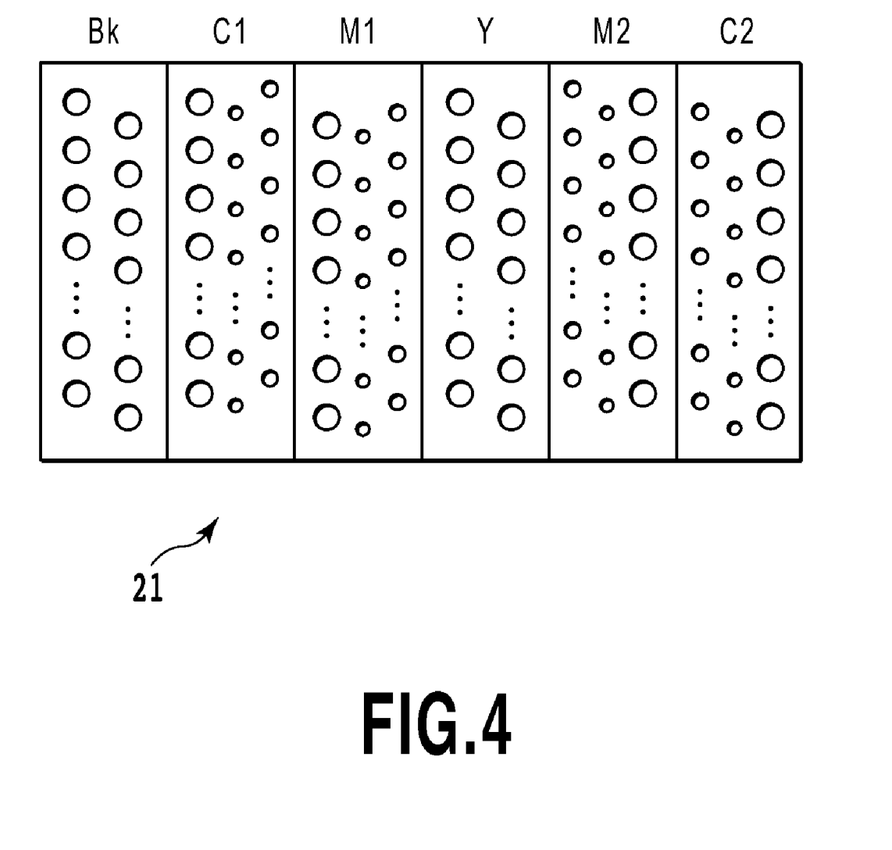
FIG. 4 is a plain view of the print head of the first embodiment, seen from the surface where ejection outlets are formed.

FIG. 4 is a plain view of the print head 21 of the present embodiment including multiple nozzle arrays, seen from the surface where the ejection outlets are formed. In the print head 21 of the present embodiment, nozzle arrays each formed by arranging multiple ink-ejecting nozzles are arranged in the main scan direction for multiple colors (four colors in the present embodiment). These nozzle arrays are divided in six blocks, as shown in FIG. 4. Block C1 and Block C2 both include nozzle arrays for cyan ink, Block M1 and Block M2 both include nozzle arrays for magenta ink, Block Y includes nozzle arrays for yellow ink, and Block Bk includes nozzle arrays for black ink. Each nozzle array has 256 nozzles arranged in the sub scan direction at 1/600 inches intervals. An image having about a 10.8 mm length in the sub scan direction can be printed with those nozzle arrays.

Block Bk and Block Y each include two arrays of ejection outlets arranged at 600 dpi, and the ejection outlets of one nozzle array are shifted by a half pitch in the sub scan direction from the corresponding ejection outlets of the other nozzle array. Each ejection outlet ejects about 5.5 pl of ink droplet. Blocks C1 and C2 and Blocks M1 and M2 each include three nozzle arrays ejecting about 5.5 pl of ink droplet, about 2.5 pl of ink droplet, and about 1.5pl of ink droplet, respectively. The nozzle arrays, in the respective Blocks C1 and C2, ejecting the same amount of droplet are arranged so that their corresponding ejection outlets are shifted from each other by a half pitch in the sub scan direction. The arrangement direction of the multiple nozzles, with the print head 21 being mounted on the carriage 32, coincides with the sub scan direction (the direction denoted by array Y) which is a transport direction of the print medium P (see FIG. 1). Accordingly, the main scan direction of the print head 21 is perpendicular to the sub scan direction, namely, is the direction denoted by arrow X.

(Characteristic Configuration)

A characteristic configuration of the embodiment of the present invention is described below with reference to the drawings. In the present embodiment, print data is split among the nozzles of the print head 21 by thinning out the print data using a mask pattern which has low-print-percentage areas (high-thinning-percentage areas or a first area) and high-print-percentage areas (low-thinning-percentage areas or a second area) each having a predetermined width. This is one of the characteristic configurations of the present embodiment.

Figure 5:
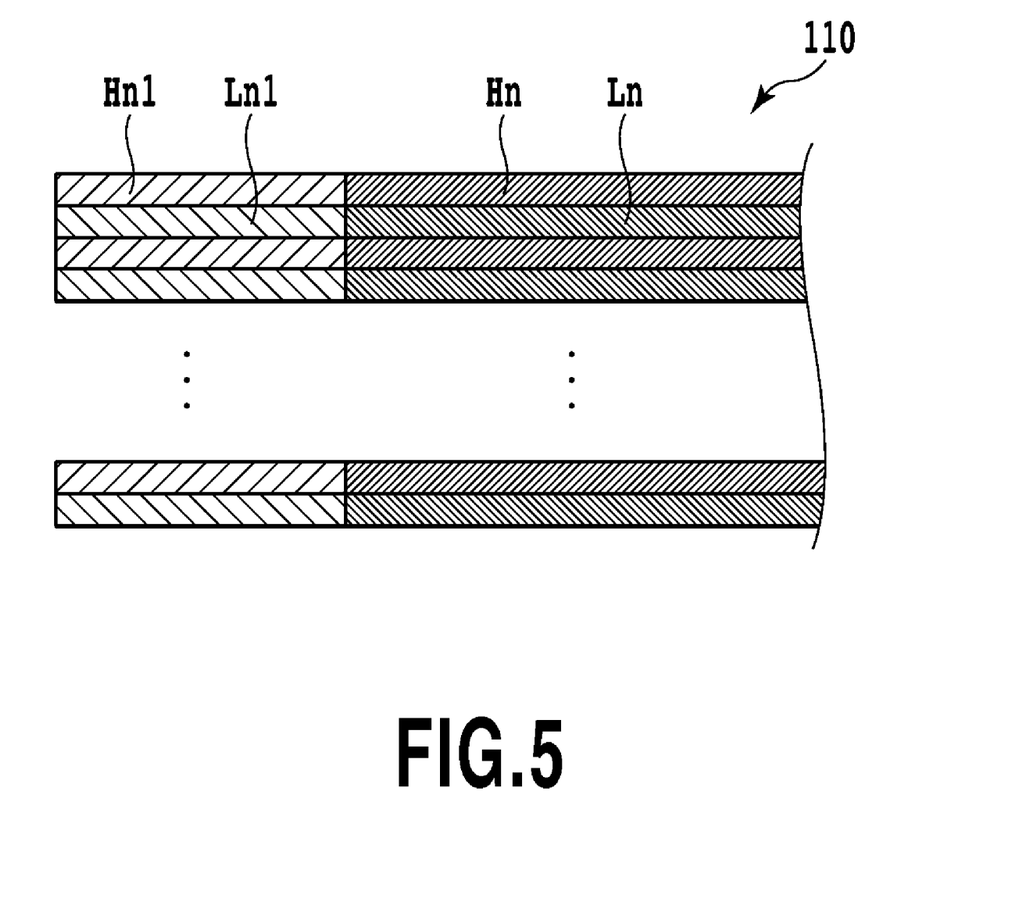
FIG. 5 is a plain view schematically showing a portion of a mask pattern.

FIG. 5 is a plain view schematically showing a portion of a mask pattern 110 used in the processing for thinning out print data for a single scan by the print head 21. FIG. 5 shows a portion of the mask pattern 110 used for an image formed by a first scan, or more specifically, shows only a portion of the mask pattern 110 used for an area from the left edge to almost the center of a print image. The mask pattern 110 is an example of a mask used in a so-called two-pass print method in which each print area is completed through two scans compensating for each other. The mask pattern 110 includes, in its center part, high-print-percentage areas Hn each having a print percentage of 50% or higher and low-print-percentage areas Ln each having a print percentage of lower than 50%. The overall height (in an image longitudinal direction) of the mask pattern 110 is set to have as many pixels as the number of the nozzles, 256, of one nozzle array of the print head 21 (see FIG. 4).

The overall width (in an image lateral direction) of the mask pattern 110 has 9600 pixels (=print resolution (1200 dpi)×maximum print width (8 inches)). Note here that, in regard to the image lateral direction, any portion may be extracted from the mask pattern 110 to form a mask, for each scan, corresponding to the width of an image to be printed and to use the mask for the image to be printed. The low-print-percentage areas (high-thinning-percentage areas) Ln are where the print data binarized by the image processing unit 76 is thinned out with a high thinning percentage. The high-print-percentage areas (low-thinning-percentage areas) Hn are where the binarized print data is thinned out with a low thinning percentage. In the present embodiment, the high-print-percentage areas Hn are each set to have a print percentage of 65%, and the low-print-percentage areas Ln are each set to have a print percentage of 35%.

In the present embodiment, in the image left-edge part, the mask pattern 110 has: high-print-percentage areas Hn1 having a print percentage different from, that is, lower than that of the high-print-percentage areas Hn in the image center part; and low-print-percentage areas Ln1 having a print percentage different from, that is, higher than that of the low-print-percentage areas Ln in the image center part. Accordingly, the print-percentage difference in the image left-edge part is smaller than that in the image center part, and the print-percentage difference in the image left-edge part may be zero. In the present embodiment, the print percentage in the image left-edge part is set to 50% for both of the high-print-percentage areas Hn1 and the low-print-percentage areas Ln1. Note that an image right-edge part, which is not shown, has a mirror-image pattern of the image left-edge part.

As mentioned earlier, the print method of the present embodiment employs the so-called two-pass print method in which each print area is completed through two scans compensating for each other. The print steps of the present embodiment are as follows. First, a first scan is performed through print operations using the mask pattern shown in FIG. 5. Next, the sheet is transported by a half the height of the print head 21. Then, a second scan is performed using an inverted pattern (not shown) of the mask pattern 110. Next, the sheet is further transported by the same distance as the previous transport, and the first scan is performed using, again, the mask pattern 110. By thus repeating the first scan and the second scan, an image print is completed.

Use of the mask pattern 110 for printing through high-speed scans with the print head as shown in FIG. 4 having nozzle arrays each including nozzles densely arranged allows ink droplets to exhibit excellent flying behavior. Thus, an excellent image having little landing error can be formed.

Incidentally, when the two-pass print method is employed for printing, an image in a scan start portion of one scan and an image in a scan end portion of the other scan overlap each other in the image left-edge and right-edge parts. A print head has a higher temperature at the end of scans than at the start of the scans. For this reason, when a mask pattern with areas having different print percentages is used in a conventional print method, print concentration is higher in the high-print-percentage areas printed at the end of the scans than in the high-print-percentage areas printed at the start of the scans. This has been causing a printed image to have tone unevenness.

The larger the difference in print percentage between the high-print-percentage areas and the low-print-percentage areas, the more noticeable such tone unevenness. Having a relatively high ejection duty, the high-print-percentage areas become the dominant factor for the tone unevenness. The higher the ejection duty in the high-print-percentage area, the greater the local temperature elevation of the nozzle group printing the high-print-percentage area. The size of droplets in the high-print-percentage area is therefore larger than that in the low-print-percentage area. Accordingly, the higher the ejection duty ratio in the high-print-percentage area, the greater the concentration difference between the high-print-percentage area printed at an elevated temperature and the high-print-percentage area printed at the start of the scans at, therefore, a relatively low temperature.

Reduction in the print-percentage difference between the high-print-percentage area and the low-print-percentage area brings reduction in the ejection-duty difference between the high-print-percentage area and the low-print-percentage area. This also allows reduction in the difference in how much the temperature of the nozzle group elevates between the high-print-percentage area and the low-print-percentage area, and thus reduces the tone difference between the areas. Accordingly, even if the print head has a different temperature between the start of the scans and the end of the scans, there is no tone unevenness between the areas because the tone difference between the areas is small in the first place. In the present embodiment, the high-print-percentage area and the low-print-percentage area have zero difference in print percentage in the image left-edge and right-edge parts, and therefore have no difference in how much the temperature of the print head elevates; accordingly, tone unevenness is prevented.

Meanwhile, an air current generated and flowing between the print head and the print medium at the start of the scans is small, and a mask pattern for the image center part suppresses a bypass air current at the end of the scans. Accordingly, the landing position shift due to the air current is minor even if the print-percentage difference between the high-print-percentage area and the low-print-percentage area is reduced in the image left-edge and right-edge parts. Although the two-pass print method has been shown as an example in the present embodiment, it is needless to say that the present invention is applicable to other print methods such as a three-pass print method and a four-pass print method.

Moreover, it is to be noted that the present invention is not limited to the case where the high-print-percentage area and the low-print-percentage area have zero, namely no, print-percentage difference in the image left-edge and right edge parts. An objective of the present invention is achievable by making small the print-percentage difference between the high-print-percentage area and the low-print-percentage area in the image left-edge and right-edge parts.

As described above, in a multiple-pass print using mask patterns each having low-print-percentage areas and high-print-percentage areas, the print-percentage difference between the high-print-percentage areas and the low-print-percentage areas is cancelled out in the left-edge and right-edge parts of the print image. Thereby, an inkjet print apparatus and an inkjet print method capable of a print without concentration unevenness can be implemented.

(Second Embodiment)

A second embodiment of the present invention is described below with reference to the drawings. Note that the basic configuration of the present embodiment is the same as that of the first embodiment, and therefore only the characteristic configuration is described below.

Figure 6:
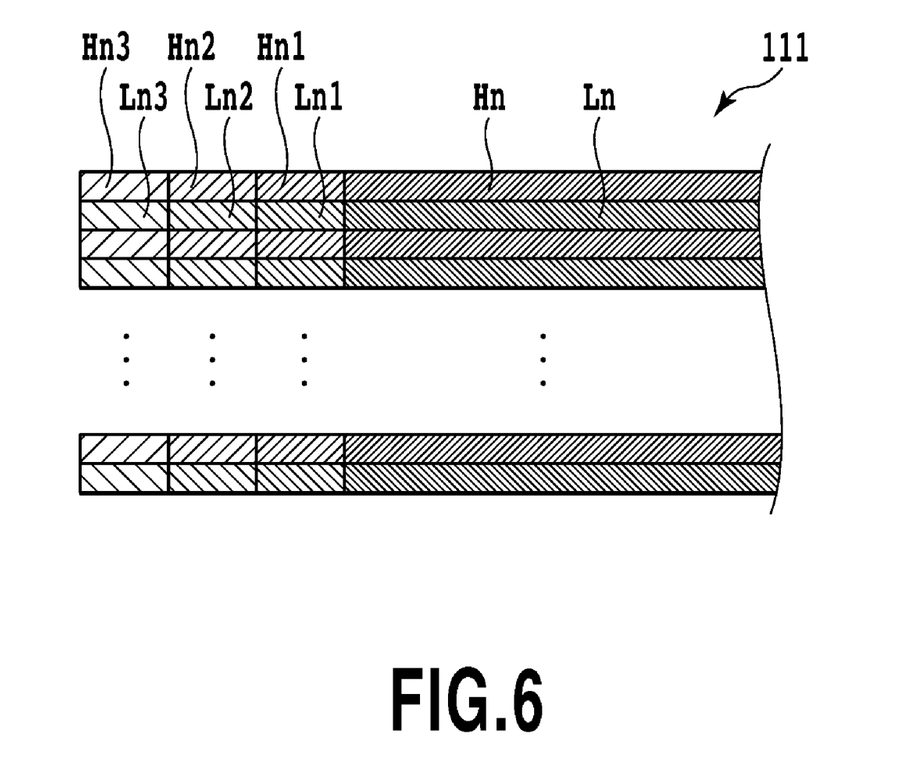
FIG. 6 is a plain view of a mask pattern according to a second embodiment.

FIG. 6 is a plain view schematically showing a portion of a mask pattern 111. FIG. 6 shows a portion of the mask pattern 111 is an example of a mask used in the so-called two-pass print method in which each print area is completed through two scans compensating for each other. The mask pattern 111 includes, in its center part, high-print-percentage areas Hn each having a print percentage of 50% or higher and low-print-percentage areas Ln each having a print percentage of lower than 50%. FIG. 6 shows a portion of the mask pattern 111 used for an image formed by a first scan, or more specifically, shows only a portion of the mask pattern 111 used for an area from the left edge to almost the center of a print image.

The overall height (in an image longitudinal direction) of the mask pattern 111 is set to have as many pixels as the number of the nozzles, 256, of one nozzle array of the print head 21 in FIG. 4. The overall width (in an image lateral direction) of the mask pattern 111 has 9600 pixels (=print resolution (1200 dpi)×maximum print width (8 inches)). Note here that, in regard to the image lateral direction, any portion may be extracted from the mask pattern 111 to form a mask, for each scan, corresponding to the width of an image to be printed and to use the mask for the image to be printed.

The mask pattern 111 has low-print-percentage areas and high-print-percentage areas at its image left-edge part. The print percentage difference between the corresponding ones of the high-print-percentage areas and the low-print-percentage areas decreases toward the edge. Although not shown, the image right-edge part has a mirror image of the image left-edge part. In the present embodiment, the high-print-percentage areas Hn and the low-print-percentage areas Ln at the image center part have print percentages of 65% and 35%, respectively. The print percentages of high-print-percentage areas Hn1 to Hn3 at the image left-edge part are as follows: Hn1=60%, Hn2=55%, and Hn3=50%. In this way, the print percentage decreases toward the edge.

In contrast, the print percentages of low-print-percentage areas Ln1 to Ln3 at the image left-edge part are as follows: Ln1=40%, Ln2=45%, and Ln3=50%. In this way, the print percentage increases toward the edge. In the image edge part, in respect to each boarder across which the print percentage changes, the print-percentage difference between the left side and the right side of the boarder is smaller in the present embodiment than in the first embodiment. This is a more preferable configuration in view of image formation. The number of stages of the print-percentage change, the print percentages, the sizes of the areas, and the like in the image edge parts can be freely set as long as they cause no problem in image formation.

As described, in a multiple-pass print using mask patterns each having low-print-percentage areas and high-print-percentage areas, the print-percentage difference between the high-print-percentage areas and the low-print-percentage areas is cancelled out in the left-edge and right-edge parts of the print image. Thereby, an inkjet print apparatus and an inkjet print method capable of a print without concentration unevenness can be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-234217, filed Oct. 8, 2009, which is hereby incorporated by reference herein in its entirety.

What is claimed is:

1. An inkjet print apparatus comprising:
a print device that performs a print by ejecting ink;
a scanning device for causing the print device to scan a same print area a plurality of times;
a thinning device that thins out binary image data for the same print area by using different mask patterns corresponding to the respective plurality of times of the scans of the same print area; and
a print control device that completes the print on the same print area by printing thinned images on the same print area on the basis of binary image data sets obtained by the thinning device for the respective plurality of times of the scans, wherein
each of the different mask patterns includes a first area and a second area, the first area having the binary image data thinned out at a relatively high percentage, the second area having the binary image data thinned out at a relatively low percentage, and
a difference in print percentage between the first area and the second area in each of both edge parts of an image to be printed where the print head scans back is smaller than a difference in print percentage between the first area and the second area in a center part of the image.

2. The inkjet print apparatus according to claim 1, wherein there is no difference in print percentage between the first area and the second area in each of both the edge parts of the image.

3. The inkjet print apparatus according to claim 1, wherein
the print percentage of the first area increases from the center part of the image toward each of both the edge parts of the image, and
the print percentage of the second area decreases from the center part of the image toward each of both the edge parts of the image.

4. The inkjet print apparatus according to claim 1, wherein the print device includes an electric-heat converter that generates heat energy for ejecting the ink.

5. An inkjet print method comprising:
a print step of performing a print by ejecting ink from a print device;
a scan step of causing the print device to scan a same print area a plurality of times;
a thinning step of thinning out binary image data for the same print area by using different mask patterns corresponding to the respective plurality of times of the scans of the same print area; and
a print control step of completing the print on the same print area by printing thinned images on the same print area on the basis of binary image data sets obtained by the thinning device for the respective plurality of times of the scans, wherein
each of the different mask patterns includes a first area and a second area, the first area having the binary image data thinned out at a relatively high percentage, the second area having the binary image data thinned out at a relatively low percentage, and
a difference in print percentage between the first area and the second area in each of both edge parts of an image to be printed where the print head scans back is smaller than a difference in print percentage between the first area and the second area in a center part of the image.

* * * * *